United States Patent [19]

Gupta

[11] Patent Number: 5,428,627
[45] Date of Patent: Jun. 27, 1995

[54] METHOD AND APPARATUS FOR INITIALIZING AN ECC CIRCUIT

[75] Inventor: Alok K. Gupta, Irvine, Calif.

[73] Assignee: Qlogic Corporation, Costa Mesa, Calif.

[21] Appl. No.: 974,158

[22] Filed: Nov. 10, 1992

[51] Int. Cl.⁶ .............................................. G06F 11/10
[52] U.S. Cl. ................... 371/37.1; 371/39.1
[58] Field of Search ................. 371/37.1, 37.2, 37.3, 371/37.4, 38.1, 39.1, 44, 45; 341/93, 94, 101, 102

[56] References Cited

U.S. PATENT DOCUMENTS

| | | | |
|---|---|---|---|
| 3,800,281 | 3/1974 | Devore et al. | 371/37.4 |
| 4,500,926 | 2/1985 | Yoshimaru | 371/37.1 |
| 4,777,635 | 10/1988 | Glover | 371/40.1 X |
| 4,972,417 | 11/1990 | Sako et al. | 371/37.1 X |
| 4,975,915 | 12/1990 | Sako et al. | 371/37.4 |
| 5,218,564 | 6/1993 | Covey | 360/750.5 |
| 5,280,488 | 1/1994 | Glover et al. | 371/39.1 X |
| 5,285,327 | 2/1994 | Hetzler | 360/48 |

Primary Examiner—Roy N. Envall, Jr.
Assistant Examiner—Brian C. Oakes
Attorney, Agent, or Firm—Spensley Horn Jubas & Lubitz

[57] ABSTRACT

A method and apparatus for converting input symbols of a fixed length, to output symbols of a greater fixed length. Input symbols are received one at a time and are clocked into the staging register. When a new input symbol is loaded into the staging register, the contents of the first stage are moved to a second stage of the staging register. The new input symbol is loaded into the cells of the first stage. Multiplexers select the contents of cells of the staging register to form the output symbol. A modulo-x counter counts the incoming input symbols. The output of the counter determines which cells the multiplexer selects. Initially, the first stage of the staging register is preloaded with a predetermined pad symbol, and the modulo-x counter is preset. The first output symbol consists of a number of bits from the pad symbol and those bits of the first input symbol needed to complete the first output symbol.

5 Claims, 5 Drawing Sheets

METHOD AND APPARATUS FOR INITIALIZING AN ECC CIRCUIT

BACKGROUND OF THE INVENTION

1. Field of the Invention

This invention relates to a method and apparatus for transmitting or storing digital data, and more particularly to an improved method and apparatus for converting digital symbols of a fixed length into symbols having a greater fixed length for an error correction code circuit.

2. Description of Related Art

Due to the widespread use of digital data, many people have attempted to devise methods for improving the reliability of digital data transfers. One well-known method for improving the reliability of digital data transfers is to create and append Error Correction Codes (ECCs) to the data that is transferred. In some error correction schemes, ECCs are associated with symbols formed from groups of data bits. Errors in the received data due to distortion during transmission of the symbols can be corrected, thereby allowing recovery of the symbols, or bits of symbols, that would otherwise be lost.

One such error correction code is known as a Reed-Solomon Code. Reed-Solomon Codes are widely used in the computer industry for transmission of digital data to and from data storage devices because of the error propagation properties of modulation codes commonly used for such transmissions, such as RLL. Due to these error propagation properties, most errors come in the form of short burst errors. Symbol based ECCs, such as Reed-Solomon Codes, are inherently good at correcting short burst errors.

Typically, the size of a symbol used in the computer industry is 8 bits of digital data, commonly referred to as a byte. Bytes of data are typically transferred in blocks equal in size to a sector of stored data. Sector sizes typically used in the computer industry are 512 Bytes and 1 Kbyte. For simplicity, the size of an ECC symbol has been equal to the size of the data symbols being processed in the particular computer (i.e., 8-bits). However, using an ECC symbol size of 8 bits makes it necessary to transmit more ECC code bits to correct a sector of data corrupted by a typical burst error than would be necessary if a longer ECC symbol size were used. Therefore, valuable storage capacity and transmission efficiency is lost.

For example, a Reed-Solomon Code with symbol size equal to n can have a codeword (which consists of data symbols and check symbols) of $2^n-1$. Therefore, a Reed-Solomon Code with a symbol size of 8 can have a codeword of $2^8-1$ (255). A sector of length 1 Kbyte would require 5 such codewords, since each codeword includes only 255 8-bit data symbols, including the check symbols (i.e., each codeword includes less than the 255 data symbols required to transmit a sector of 1,024 bytes using only four codewords). Each codeword is interleaved with the other codewords to provide correction capability for the greatest number of consecutive errors. This is referred to as an interleaving degree of 5. The number of codewords required is determined by the number of data symbols to be protected, while the degree of interleaving is determined by the number of consecutive bits expected to be corrupted in the worst case. For example, if a relatively small number of bits are expected to be corrupted, the interleaving degree can be relatively low. However, if the total number of data symbols expected to be corrupted is large, the degree of interleaving must be greater.

Having an increased interleaving degree provides longer burst correcting capability. However, use of five codewords significantly increases the number of ECC check symbols required and decreases the reliability of the data (i.e., a higher probability of miscorrection). The length of the error burst which typically occurs in transmissions of data to a storage device is known in the art to usually be short enough that an interleaving degree of 2 is sufficient to correct all the errors which might occur. Therefore, it is inefficient to create a sector of data which has an interleaving degree greater than 2.

One way to deal with the desire to transfer a 1 Kbyte long sector of data having an interleaving degree of 2 is to increase the size of the Reed-Solomon symbol. A Reed-Solomon symbol of size 9, for example, would have a codeword of a maximum length equal to $2^9-1=511$ symbols. Therefore, a 1 Kbyte sector could be transferred with an interleaving degree of 2. The number of information words is $D \times (2^n-1)-C$; where D=the interleaving degree, n=the size of the Reed-Solomon Code, and C=the number of check symbols. For example, if the interleaving degree is 2, and the number of bits in each data word is 9, then the number of 9-bit data symbols is $(2)\times(511)-C$. Because there are 1,022 9-bit symbols (9,198 bits), there are a sufficient number of bits to transmit the 1,024 8-bit data bytes (i.e., 1 Kbyte sector of data), and also transmit the number of 9-bit check symbols required to correct for burst errors of an expected duration (i.e., 1,024 8-bit bytes require 8,192 bits, leaving 1,006 bits available for check symbols).

However, use of a Reed-Solomon Code symbol that is longer than the standard byte of data which is typically handled by a computer creates difficulties. For example, typically the incoming data is received along with a byte clock that clocks in an 8-bit byte. Therefore, a new clock must be synchronized to the new symbol size. Also, almost all standard circuitry (such as internal data buses) is physically configured to process data in 8-bit bytes. Therefore, transferring 9 bit symbols presents a problem.

One means to solve the problems is to add "dummy" characters to each 8-bit byte to increase the symbol size, and strip the dummy character upon decoding the transmission. Obviously, this solution would make the transmission of the sector substantially slower. It should also be noted that the relative order of the bits cannot be disturbed, since it is only by maintaining the relative order of the bits within a symbol, and the symbols within the codeword, that the Reed-Solomon method of error correction can determine the particular bits in error. Therefore, solutions which distribute bits of one symbol among other symbols, and in so doing disturb the order of the bits, make it difficult to correct errors.

A method for converting a symbol of length m into a symbol of length n, where n is greater than m, is described in a copending U.S. application for patent, Ser. No. 07/942,587, entitled "Method and Apparatus for Initializing an ECC Circuit", assigned to the assignee of the present invention, and incorporated herein by reference. The method described in that application requires a staging register, a number of multiplexers, a modulo-x counter, and an output clock generator circuit. When the symbol converter is used to generate symbols having a length n to be stored on a data storage device, the staging register receives a number of input symbols of length m from a storage device controller input circuit in m-bit parallel format. The input symbols are received one at a time and are clocked into the staging register by a clock associated with the input symbol. Each bit of the input symbol is stored in a register cell of the staging register. The input symbols are also coupled from the storage device controller input circuit to a storage device controller output circuit. As the storage device controller output circuit receives each symbol from the storage device controller input circuit, the input symbol is converted to a serial format and transmitted to the storage device for storage therein.

The cells of the staging register within the symbol converter are divided into stages, each stage including m cells. The cells of the staging register are numbered 1 through y; where $y = (a) \times (m)$, m = the length of the input symbol, and a = the number of stages in the staging register. When a new input symbol is loaded into the staging register, the contents of cell x are moved to cell $x - m$, i.e., moved from a first stage to a second stage of the staging register. The new input symbol is loaded into the cells of the first stage of the staging register (i.e., the m cells with the highest numerical designations).

N multiplexers correspond to each of the n bits of the output symbol. Each multiplexer selects the contents of one of m cells of the staging register to form an output symbol. The particular cells from which the multiplexer can choose are a function of the lengths of the input symbol and the output symbol. The modulo-x counter counts the incoming input symbols. The output of the counter determines which cell each multiplexer selects. The modulus of the modulo-x counter is determined based upon the lengths of the input and output symbols.

Figure 1:
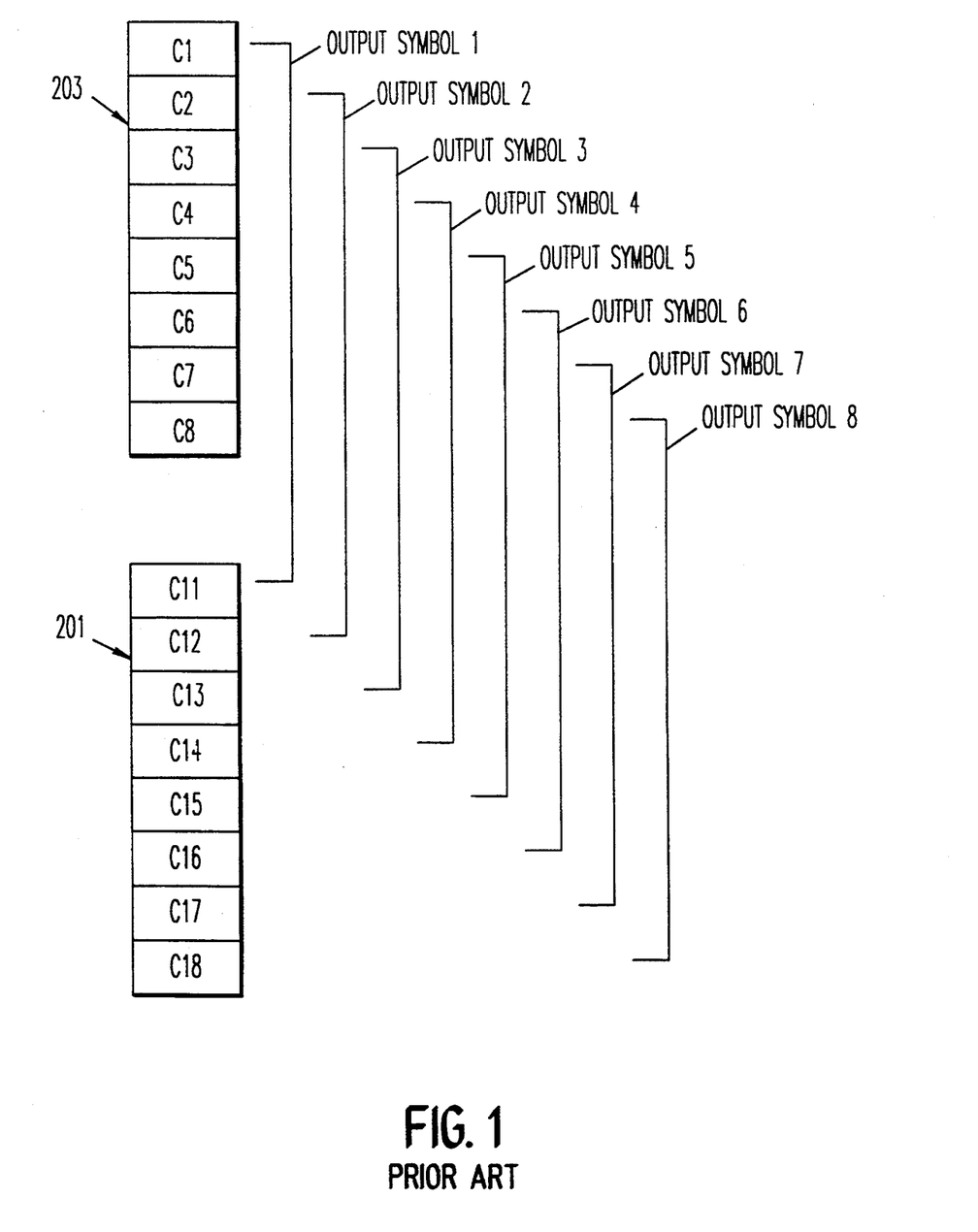
FIG. 1 is a graphic illustration of the particular bits of the staging register selected to generate output symbols in the invention of a copending U.S. application for patent, Ser. No. 07/942,587, having 8-bit long input symbols and 9-bit long output symbols.

The bank of multiplexers creates a moving window into the staging register. FIG. 1 illustrates how the window is moved up through the staging register by the modulus-x counter as each new input symbol is loaded into the staging register. The first output symbol consists of all the bits of the first input symbol, plus the first $n - m$ bits of the second input symbol. The second output symbol consists of the remaining bits of the second input symbol (which are shifted into the second stage of the staging register) plus those bits of the third input symbol (which are loaded into the first stage of the staging register) which are required to create the n-bits of the second output symbol. Each subsequent input symbol is loaded into the first stage of the staging register. When the input symbols are loaded, each previously loaded input symbol is shifted to the next stage of the staging register. As n cells of the staging register are filled with the bits from the input symbols, the multiplexers, under the control of the modulo-x counter, select the contents of the appropriate n cells of the staging register to generate output symbols.

In such a converter, the modulo-x counter is initialized to zero. Therefore, when the number of bits in the input block is not an integer multiple of the output symbol size, "pad bits" must be inserted in the last output symbol so that it will have a proper output symbol length. For example, if the input symbol size is 8, and the output symbol size is 9, and the input block consists of 12 symbols, there are $12 \times 8 = 96$ bits of information in the input block. To transmit all 96 bits as 9-bit output symbols requires eleven, 9-bit output symbols. Since eleven, 9-bit output symbols have a total of 99 bits, 3 pad bits must be inserted into the output block. Since the modulo-x counter was initialized to zero, the first window will include all the bits of the first input symbol (i.e., 8 bits) and the first bit of the second input symbol. The next output symbol generated will consist of the 7 remaining bits of the second input symbol and the first 2 bits of the third input symbol, etc. When the 11th output symbol is generated, it will consist of the remaining 6 bits from the 12th input symbol. Therefore, 3 pad bits will be required to complete the 11th 9-bit output symbol. The output symbols are coupled to an ECC circuit which generates check symbols. The check symbols are appended to the data that is coupled from the storage device controller input circuit to the storage device controller output circuit.

Because the output of the ECC circuit is not complete until the 3 pad bits have been coupled to the ECC circuit, and because the data coupled from the storage device controller input circuit to the storage device controller output circuit is transmitted to the data storage unit as it is received, there is a delay between the time the last bit of the last data symbol is sent from the storage device controller output circuit to the data storage device and the time the ECC check symbols are complete. This delay is equal to the time required to input the pad bits to the ECC circuit. Therefore, since the data and the check symbols must be written as a contiguous stream of data bits to the data storage device, null data is output by the storage device controller output circuit while the storage device controller output circuit waits for the ECC check symbols to be completed. The null data corresponds to the pad bits being input to the ECC circuit. Hence, the pad bits are, in effect, written to the storage device as part of the data field, thereby taking up storage space which could be used to store bits which carry information.

The amount of space lost can become significant. For example, in a disk drive storage device which is capable of storing 100 Mbytes of data, organized in 512 byte sectors, there are 200,000 sectors. If each sector had the maximum number of pad bits (i.e., in a system having an 8-bit to 9-bit converter, 8 pad bits would be the maximum) 200,000 bytes of storage space are lost.

Therefore, there is a need for a method and apparatus for converting symbols of length m into symbols of length n, where n is greater than m, without the need to store extra pad bits which carry no useful information. The present invention provides such a method and apparatus.

SUMMARY OF THE INVENTION

The preferred embodiment of the present invention is a method and apparatus for converting input symbols of a fixed length, to output symbols of a greater fixed length in such a way that only relevant bits of data are stored in a data storage unit.

The preferred embodiment of the present invention, includes a staging register which can be preloaded with a predetermined value, a number of multiplexers, a modulo-x counter that can be preset to a predetermined value, and an output clock generator circuit. Input symbols are received one at a time and are clocked into the staging register by a clock associated with the input symbol. Each bit of the input symbol is stored in a register cell of the staging register. The cells are divided into stages, each stage including m cells. The cells of the staging register are numbered 1 through y, where y=-(a)×(m), m=the length of the input symbol, and a=the number of stages in the staging register. When a new input symbol is loaded into the staging register, the contents of cell x are moved to cell x−m, i.e., moved from a first stage to a second stage of the staging register. The new input symbol is loaded into the cells of the first stage of the staging register (i.e., the m cells with the highest numerical designations).

N multiplexers correspond to each of the n bits of the output symbol. Each multiplexer selects the contents of one of m cells of the staging register to form the output symbol. The particular cells from which the multiplexer can choose are a function of the lengths of the input symbol and the output symbol. The modulo-x counter counts the incoming input symbols. The output of the counter determines which cell each multiplexer selects. The modulus of the modulo-x counter is determined based upon the length and number of the input and output symbols.

The bank of multiplexers creates a moving window into the staging register. The window is moved up through the staging register by the modulo-x counter as each new input symbol is loaded into the staging register. Initially, the first stage of the staging register is preloaded with a predetermined pad symbol, and the modulo-x counter is preset to a value calculated based upon the length and number of the input symbols and the output symbols. The first input symbol is loaded into the first stage of the staging register and the pad symbol is shifted from the first stage of the staging register into the second stage of the staging register. The first output symbol consists of a number of bits from the pad symbol equal to the preset value minus the input symbol size, and those bits of the first input symbol needed to complete the first output symbol. Each subsequent input symbol is loaded into the first stage of the staging register.

When each input symbols is loaded into the first stage of the staging register, each previously loaded input symbol is shifted to the next stage of the staging register. When at least n cells of the staging register are filled with the bits of input symbols which have not previously been included in an output symbol, the multiplexers, under the control of the modulo-x counter, select the contents of the appropriate n cells of the staging register to generate output symbols. The preset value which is loaded into the modulo-x counter is determined such that the last bit of the last output symbol will also be the last bit of the last input symbol.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings refer to like elements.

DETAILED DESCRIPTION OF THE INVENTION

Throughout this description, the preferred embodiment and examples shown should be considered as exemplars, rather than as limitations on the present invention.

Overview

Figure 2:
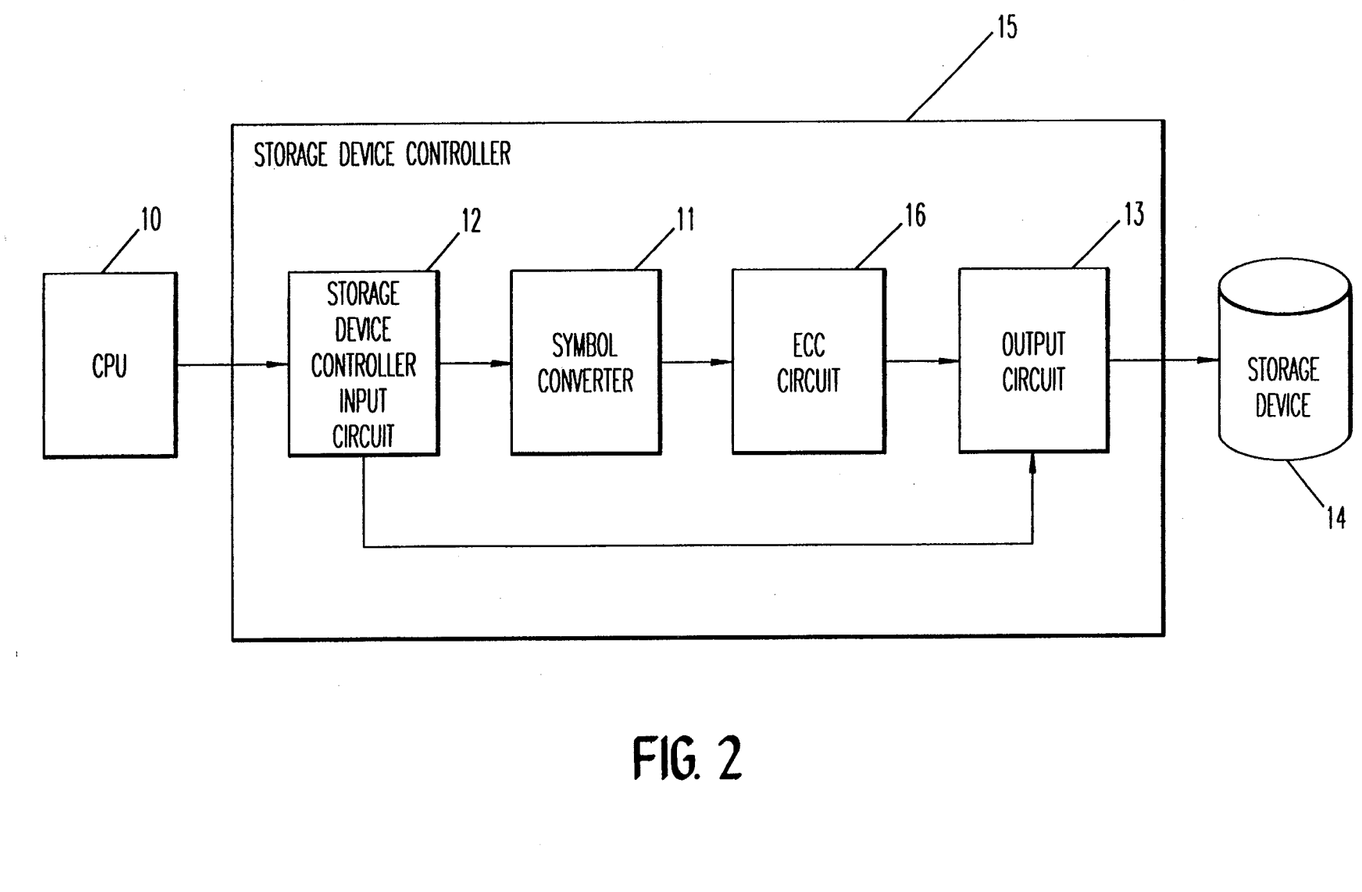
FIG. 2 is a block diagram of a computer system embodying the present invention.

FIG. 2 is a block diagram of a computer system embodying the present invention, including a Central Processing Unit (CPU) 10, a storage device controller 15 comprising a controller input circuit 12, the inventive symbol converter circuit 11, a controller output circuit 13, an Error Correction Code (ECC) circuit 16, and a data storage device 14, such as a magnetic or optical disk drive unit.

The CPU 10 sends data to the storage device controller input circuit 12. The data is organized as symbols which, in the preferred embodiment, have 8 bits. The controller input circuit 12 is coupled to the inventive symbol converter 11 and to the controller output circuit 13, and transmits data to both circuits. The symbol converter 11 also receives an input clock that synchronizes the data, allowing the symbol converter 11 to identify the beginning of each new symbol as it is transmitted.

The symbol converter 11 receives the data and reorganizes it into symbols having more than 8 bits, the first symbol having a predetermined number of "pad bits". The number of bits in each output symbol is determined to optimize the transmission of data from the storage device controller 15 to the data storage device 14 and to minimize the amount of storage space used on the data storage unit to store a particular amount of data. The number of pad bits is selected to ensure that only data bits carrying information are stored on the data storage device. The symbol converter 11 generates an output clock that pulses once for each valid output symbol that is transmitted from the symbol converter 11 to an ECC generator circuit 16.

The ECC generator circuit 16 calculates the ECC to be appended to the symbols transmitted from the controller input circuit 12 to the storage device 14. In the preferred embodiment, the ECC is symbol-based, and is most preferably a Reed-Solomon code. Once the ECC has been calculated and appended to the data, the data and ECC are transmitted to the storage device 14 for storage in known fashion. Since the pad bits are inserted by presetting the staging register within the symbol converter 11, no additional time is require for the generation of the check symbols. Therefore, the check symbols are completed at the moment that the last bit is shifted out of the storage device output circuit 13 and there is no delay between the transmission of the data and the check symbols. Hence, there no lost space on the storage device due to a delay in the completion of the check symbols.

Details of the Present Invention

Figure 3:
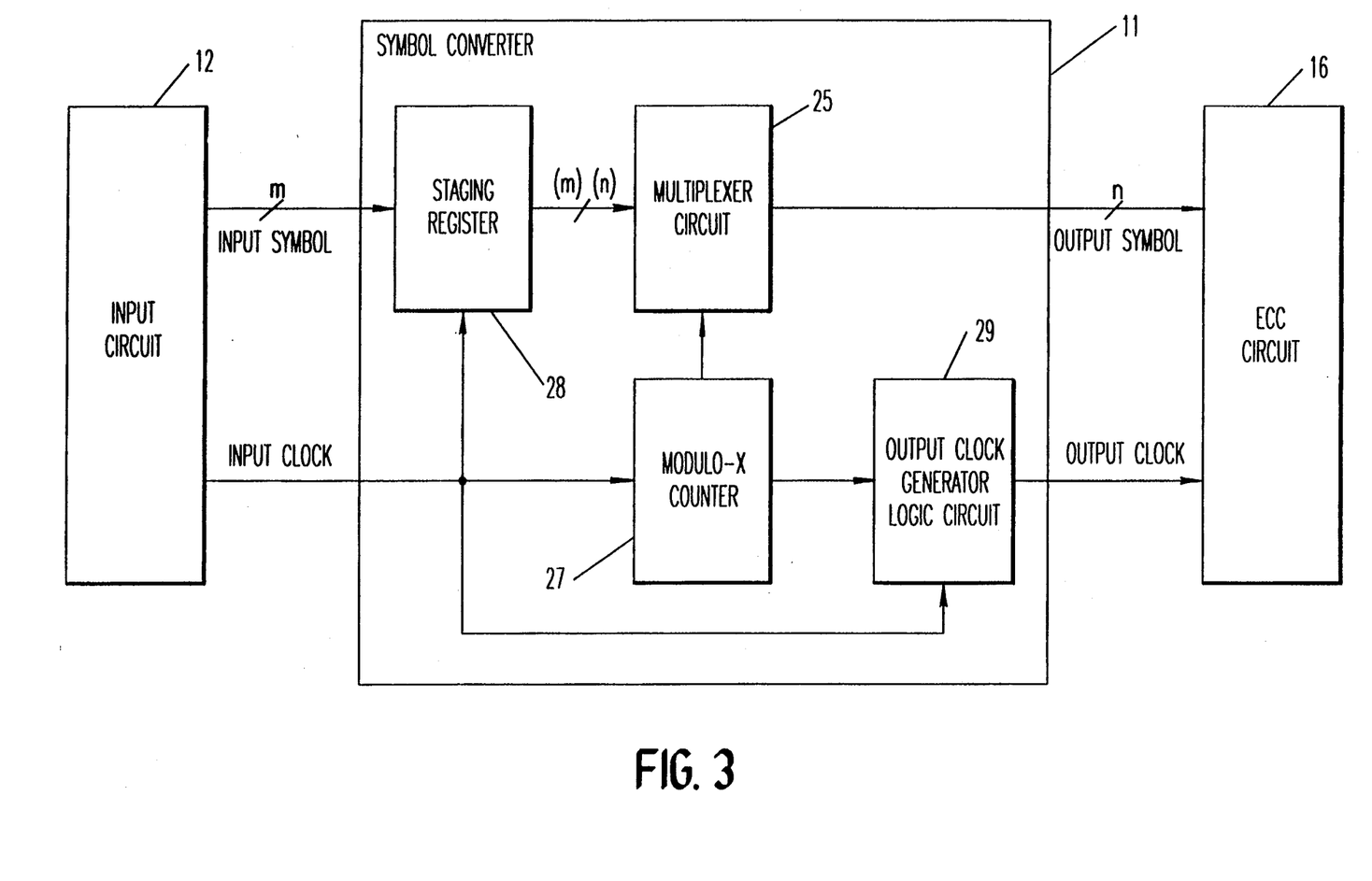
FIG. 3 is a simplified block diagram of the preferred embodiment of the present invention.

FIG. 3 is a simplified block diagram of an m to n symbol size converter 11 as implemented in the preferred embodiment of the present invention. A series of input symbols of length m are converted into a series of output symbols of length n, where m and n are integers and n is greater than m.

The input symbols are received into the converter 11 and loaded into a staging register 23. The staging register 23 buffers the input symbols and includes two or more stages, depending upon the length of both the input and output symbols. A multiplexer circuit 25 is coupled to the staging register 23. The multiplexer 25 receives m×n inputs from the staging register 23 and selects the proper n of those inputs from which an output symbol is constructed. The determination as to which n of the inputs are to be coupled to the output of the multiplexer 25 to form each output symbol is made by coupling the output of a modulo-x counter 27 to the selection inputs of the multiplexer 25.

An important aspect of the present invention is that the counter 27 is preset to a value which causes the first output symbol to include p pad bits, where $p = n - \{\text{the non-integer remainder of } ((m \times M)/n)\} \times n$, m is the number of bits in each input symbol, M is the number of input symbols, and n is the number of bits in the output symbol. By presetting the counter 27, the first symbol comprises a predetermined number of bits stored in the first stage 203 of the staging register 23, and a predetermined number of bits stored in the second stage 201 of the staging register 23. If the first stage 203 of the staging register 23 is pre-loaded with a pad symbol, the pad bits are inserted into the first output symbol. Having the first output symbol carry the required pad bits allows the ECC generation circuit to begin generating the ECC check symbols before the storage device controller output circuit 13 begins transmitting data symbols to the storage device 14. Thus, the ECC generation circuit 16 and the storage device controller output circuit 13 are synchronized such that the ECC check symbols are complete as the last bit of the last data symbol is transmitted from the storage device controller output circuit 13 to the storage device 14. Therefore, the ECC check symbols are stored directly after the last bit of the last data symbol and no null bits are stored.

The counter 27 is coupled to the input circuit 12 and receives an input clock signal therefrom. In the preferred embodiment of the present invention, the input clock signal transitions from a logic 0 state to a logic 1 state each time a new symbol is available at the input to the staging register 23. Each time a valid output symbol is generated at the output of the multiplexer 25, an output clock generator logic circuit 29 generates an output clock pulse.

The determination of the modulus of the modulo-x counter is made by dividing the least common multiple (LCM) of the length of the input symbol m and the length of the output symbol n by the length of the input symbol m. For example, to determine the modulus of the counter 27 in a converter which converts an input symbol length of 8 to an output symbol of length 12, the LCM of 8 and 12 is 24. Therefore, LCM/m = 24/8 = 3 = modulus of the counter in the 8-to-12 converter. Further details regarding the determination of the modulus of a counter with varying input symbol and output symbol lengths are provided in a copending U.S. application for patent, Ser. No. 07/942,587, entitled Method and Apparatus for initializing an ECC Circuit, and assigned to the assignee of the present invention.

The determination as to which cells of the staging register 23 are to be coupled to which inputs of the multiplexers 205 is based upon the length m of the input symbol and n of the output symbol. In converters where m is an integer multiple of the difference between n and m (i.e., $m/(n-m)$ is an integer), each multiplexer switch 205 selects cell $c = f + (b-1)(n-m)$ of the staging register 23, where c is the numerical designation of the cell selected, b is the number of the selected output of the multiplexer switch 205, f is the number of the output bit that corresponds to the multiplexer switch 205, m is the length of the input symbol, and n is the length of the output symbol.

If $m/(n-m)$ is not an integer, a third stage is required to ensure that the window does not extend beyond the second stage of the staging register 23. Details of such converters are provided in the above referenced U.S. patent application. In converters in which m is not an integer multiple of the difference between n and m, each multiplexer switch 205 selects cell $c = f + (b-1)(n-m)$ of the staging register 23 for values of $c + (n-f)$ less than or equal to 3 m, and $c' = c - (e)m$ for values of $c + (n-f)$ greater than 3 m; where c or c' are the numerical designation of the cell selected, b, f, m, and n are as above, and e is the integer dividend of c/m. For example, if $m = 8$, $n = 15$, $b = 3$ and $f = 1$, then $c = 1 + (3-1)(15-8) = 15$. Since, $c + (n-f) = 15 + 14 - 29$ is greater than $3m = 24$, the cell selected is $c' = 15 - (1)(8) = 7$.

To better understand the operation of the m to n symbol size converter of the present invention, an explanation follows of the operation of an 8-to-9 bit symbol size converter according to the present invention, in which ten 8-bit symbols are to be transmitted to a data storage unit.

Figure 4:
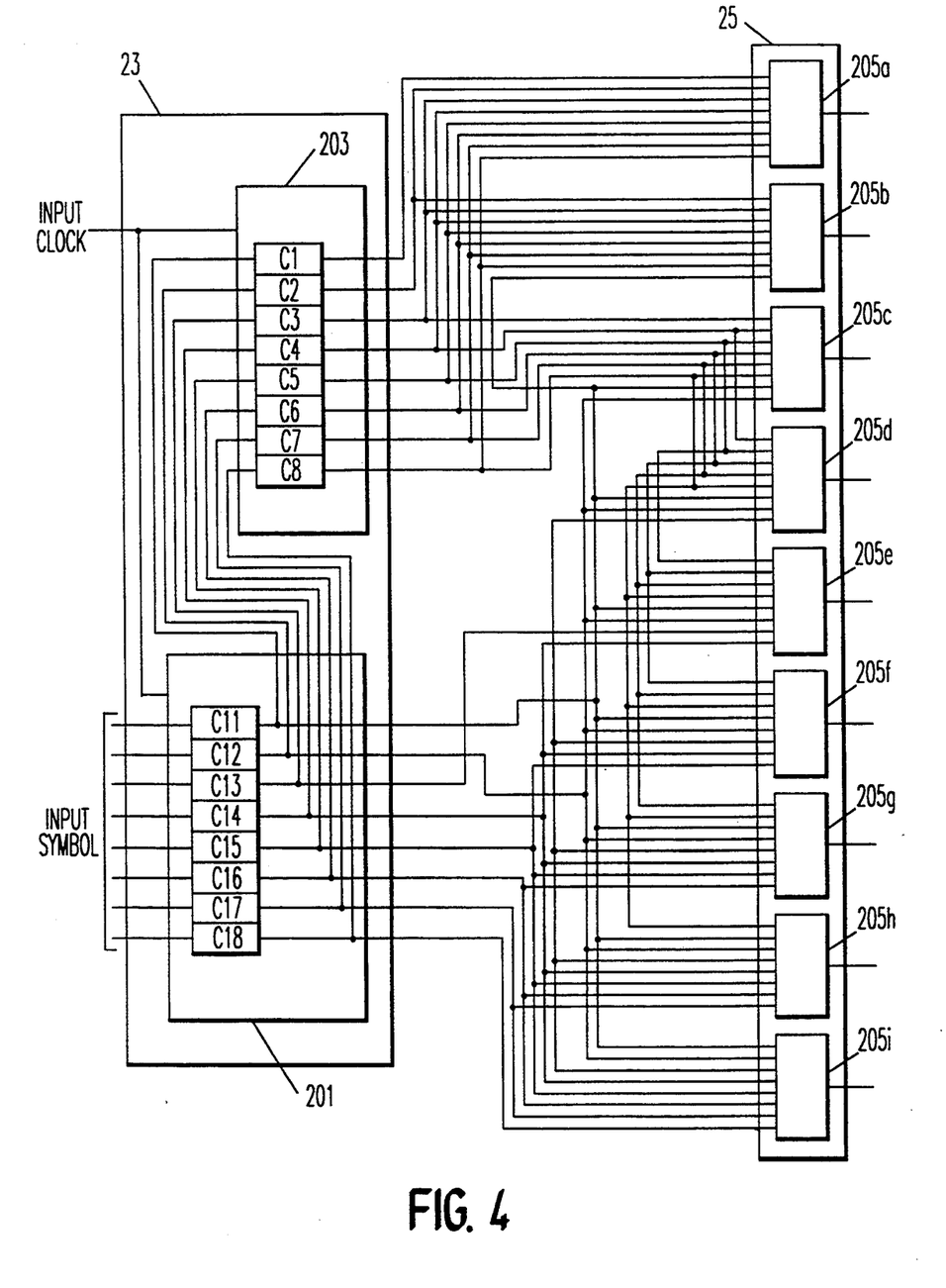
FIG. 4 is a simplified schematic of the interconnection between a staging register and multiplexers of the preferred embodiment of the present invention.

FIG. 4 shows the interconnection of the staging register 23 to the multiplexer 25 in a m to n symbol size converter 11 as implemented in the preferred embodiment of the present invention in which $m=8$ and $n=9$. As shown in FIG. 4, the staging register 23 includes a first stage 201 and a second stage 203. The first stage 201 has one register cell C11–C18 corresponding to each bit of the input symbol. The output of the first stage is coupled to the input of the second stage. The second stage 203 has one register cell C1–C8 corresponding to each of the register cells in the first stage 201.

The outputs of each register cell C1–C8, C11–C18 are coupled to the multiplexer 25. The multiplexer 25 includes n (9, in the case shown in FIG. 4) individual multiplexer switches 205a–205i, each capable of selecting one of m (8, in the case shown in FIG. 4) inputs and coupling the selected input to the outputs of the multiplexer switches 205a–205i. For example, the multiplexer switch 205a can select any of the 8 register cells C1–C8 from the second stage 203 of the staging register 23.

The modulo-x counter 27 (in the case of the example shown in FIG. 4, the counter would be a modulo-9 counter) of the preferred embodiment increments with each pulse of the input clock signal. In an alternative embodiment, the counter decrements. The output of the counter 27 is coupled to "control inputs" of each of the multiplexer switches 205. The control inputs, and thus the output of the counter 27, determine which particular input to each multiplexer switch is selected. In the example illustrated in FIG. 4, if the counter 27 output is a binary 0100, the fourth input to each multiplexer switch 205 is selected. Such multiplexer switches are well known in the art. (The exact relationship between the value at the output of the counter 27 and the particular input of each multiplexer 25 which is selected is determined by the lengths of the input and output symbols).

The input clock signal is coupled to each stage 201, 203 of the staging register 23. In the embodiment of the present invention illustrated by FIG. 4, when the input clock first transitions from a low logic level to a high logic level, the first input symbol is loaded into the first stage 201 of the staging register 23, the second stage 203 of the staging register 23 is loaded with pad bits, and the modulo-x counter 27 is preset to the value which causes p pad bits to be included in the first output symbol. The value of p is determined by the formula p=n−{the non-integer remainder of $[(8\times10)/9]\}\times9=9-(0.89\times9)=9-8=1$, as recited above. Therefore, in this example, 1 pad bit is included in the first output symbol. That is, the value to which the counter 27 is preset in the present example is determined by identifying the value of the counter 27 which will cause the first output symbol to have n−1 bits selected from the first stage 201 of the staging register 23 and 1 bit selected from the second stage 203 of the staging register 23. The second stage 203 of the staging register 23 may be preloaded with any predetermined pad bit value (i.e., the "pad symbol" is arbitrary).

In the present example, presetting the counter 27 to the value "8" causes the eighth input to each multiplexer 25 to be selected. Therefore, the first output word consists of the last bit of the second stage 203 of the staging register 23 and all eight bits of the first stage 201 of the staging register 23. The last bit of the second stage 203 of the staging register 23 is a pad bit.

The input clock is also coupled to an output clock generator logic circuit 29. The output clock generator logic circuit 29 outputs a pulse each time a valid output symbol is available at the converter 11 output. When the first input symbol is clocked into the first stage 201 of the staging register 23, the output clock generator logic circuit 29 generates an output clock pulse, since a valid output symbol is available at the output of the converter 11. Valid output symbols are available only when at least n consecutive cells C1–8, C11–18 of the staging register 23 have input symbol bits which have not previously been used to generate an output symbol.

When the next input clock pulse occurs, the contents of the first stage 201 of the staging register 23 are loaded into the second stage 203 of the staging register 23. Concurrently, a second input symbol is loaded into the first stage 201 of the staging register 23 and the counter 27 is incremented to 0 (it should be understood by those skilled in the art that the next count after 8 in a modulo-9 counter is 0). In the present example, a count of 0 always corresponds to an invalid output (i.e., only 8 input symbol bits are available in the staging register 23 which have not previously been included in an output symbol), therefore, no output clock is generated.

Figure 5:
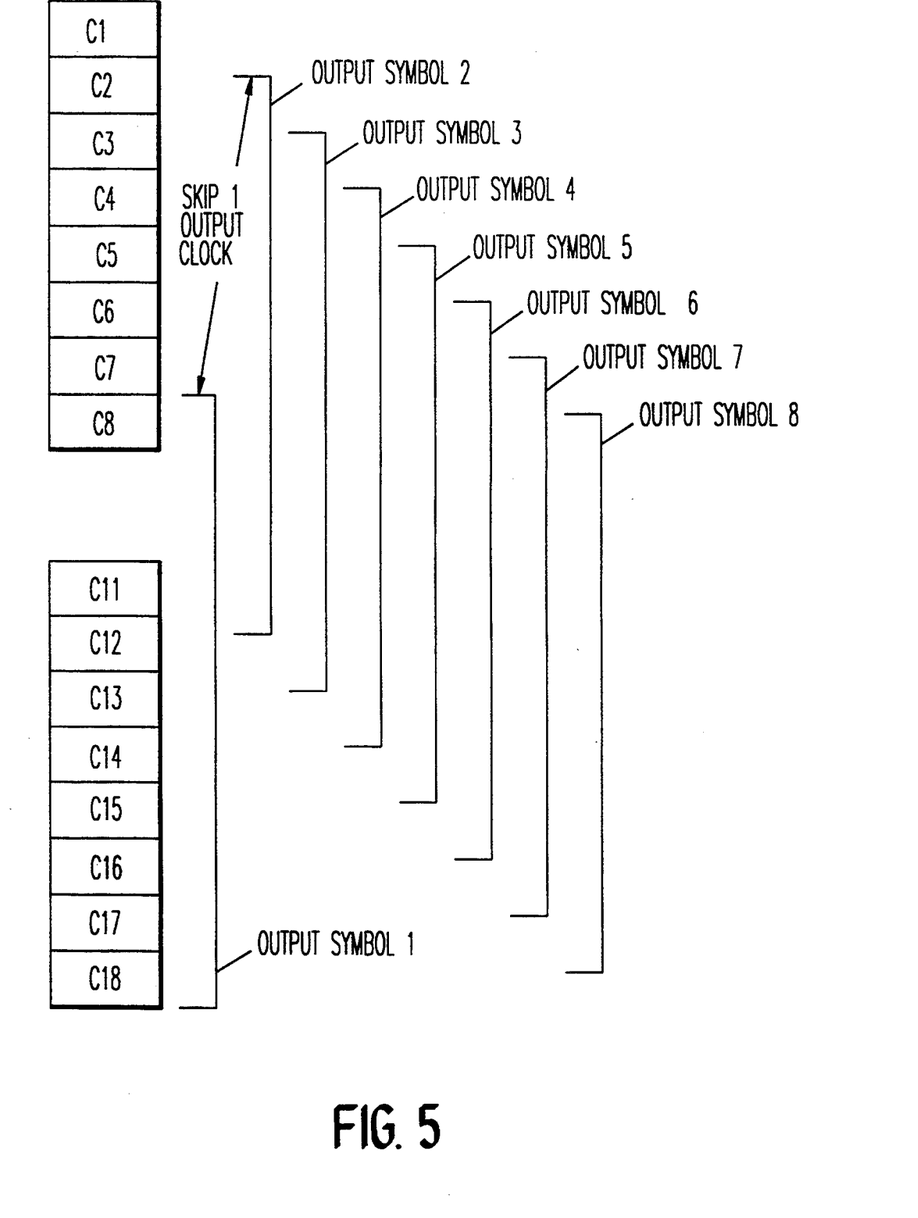
FIG. 5 is a graphic illustration of the particular bits of the staging register selected to generate output symbols in a preferred embodiment of the present invention having 8-bit long input symbols and 9-bit long output symbols.

FIG. 5 illustrates the particular bits of the staging register 23 that are selected to generate the output symbols after each input symbol has been loaded into the staging register 23 in the course of a full cycle of the conversion process. A "full cycle" of the conversion is considered to start when the modulo-x counter 27 is incremented to 0 and ends when the counter 27 again returns to 0. Therefore, a full cycle of the 8×9 symbol size converter includes the loading of 9, 8-bit input symbols. Since the counter 27 is initially preset to p (the length of the input symbol minus the number of the pad bits), the first time the counter increments to 0 a full cycle may not have been completed.

FIG. 5 illustrates an initial partial cycle which starts when the first input symbol is present at the input to the staging register 23, and a subsequent full cycle. In the illustrated embodiment, the first transition of the input clock from a low logic level to a high logic level loads the input symbol into the first stage 201 of the staging register 23, loads the second stage 203 of the staging register with the pad symbol, and presets the counter 27 to the value "8". Since a valid output symbol is generated, the clock generator logic circuit 29 generates an output clock pulse. Thus, the first output symbol includes the last bit of the second stage 203 of the staging register 23 and the first 8 bits of the first stage 201 of the staging register 23.

When the second input symbol is present at the input to the staging register 23, the input clock again transitions from a low logic level to a high logic level, causing the first input symbol to be loaded into the second stage 203 of the staging register 23, the second input symbol to be loaded into the first stage 201 of the staging register 23, and the counter 27 to be incremented to zero. Since no valid output symbol is present at the output of the multiplexer 25 when the counter 27 outputs a zero, the output clock generator logic circuit 29 does not output an output clock pulse.

When the third symbol is present at the input to the first stage 201 of the staging register 23, the input clock once again transitions from a low logic level to a high logic level. The second input symbol is loaded into the second stage 203 of the staging register 23. Furthermore, the bit previously occupying cell C12 is loaded into cell C2, the bit occupying cell C13 is loaded into C3, etc., and the counter is incremented to a count of one. Therefore, each of the multiplexer switches 205 select the first input to be coupled to the output of the multiplexer 25. Multiplexer switch 205a selects the contents of cell C1, multiplexer 205b selects the contents of cell C2, etc., and multiplexer switch 205i selects the contents of cell C11 from the first stage 201 of the staging register 23. In addition, the output generator logic circuit 29 generates an output clock which indicates that a valid output symbol is available at the output of the converter 11.

When the fourth input symbol is presented to the first stage 201 of the staging register 23, the counter 27 increments to a count of two. Therefore, multiplexer switch 205a selects cell C2, multiplexer switch 205b selects cell C3, multiplexer switch 205c selects cell C4, etc., and multiplexer switch 205i selects cell C12. A valid output symbol is present at the output of the multiplexer 25, and therefore, an output clock pulse is generated by the output clock generators logic circuit 29.

Each new input symbol is loaded into the first stage 201 of the staging register 23 and the contents of the first stage 201 of the staging register 23 are loaded into the second stage 203 of the staging register 23. The multiplexer switches each select the input that corresponds to the count of the modulo-9 counter. Therefore, a sliding window is created by the multiplexer switches 205. The sliding window moves down one cell each time a new input symbol is loaded into the first stage 201 of the staging register 23. Because the contents of cell C11 were included in the second output symbol, the window moves down to start the third output symbol with the bit that was formerly in cell C12 and which has since been loaded into cell C2.

When the tenth consecutive input symbol is loaded into the first stage 201 of the staging register 23, each multiplexer switch 205 selects the eighth input. Therefore, multiplexer switch 205a selects cell C8, multiplexer switch 205b selects cell C11, multiplexer switch 205c selects cell C12, etc., and multiplexer switch 205i selects cell C18. At this point, one full conversion cycle has been completed and the entire input data file in this example has been read. Because of the initial padding of the data stream, there is no need to insert pad bits into the last output symbol, even though the number of bits in the input data field (m×M) was not an integer multiple of the number of bits in the output symbols generated in this example.

The present invention is applicable to any values of m and n, where n is greater than m. The number of stages required for any values of m and n vary between 2 and 3 and may be determined, as may the value of modulus of the modulo-x counter, according to the description in the copending U.S. application for patent, Ser. No. 07/942,587, entitled "Method and Apparatus for Initializing an ECC Circuit", and assigned to the assignee of the present invention. For each combination of values of m, n, and M, the preset pad symbol length is determined such that the first output symbol includes exactly {the integer value of (m×M)/n}×n pad bits.

From the above description of the present invention, it can be seen that the present invention converts m-bit input symbols into n-bit output symbols in a manner that ensures that the ECC check symbols generated by the ECC generation circuit 16 are completed immediately after the last bit of the last output symbol is transmitted to the storage device 14, thereby eliminating the need to store null data bits in the storage device 14 between the last bit of the data and the first bit of the ECC check symbols. Thus, a substantial savings in the space required to store data on the storage device is realized by the use of the present invention.

A number of embodiments of the present invention have been described. Nevertheless, it will be understood that various modifications may be made without departing from the spirit and scope of the invention. For example, the input clock signal may increment the modulo-x counter upon either a positive logic pulse or a negative logic pulse. Also, the input and output symbols may be represented in either positive or negative logic. Furthermore, the pad symbol may be first loaded into the first stage of the staging register and subsequently shifted into the second stage of the staging register upon loading the first input symbol into the first stage of the staging register. Furthermore, the staging register may be implemented in a variety of ways, such as by discrete flip-flops, cross-coupled NAND-GATES, or any other means for erasably storing digital information. Accordingly, it is to be understood that the invention is not to be limited by the specific illustrated embodiment, but only by the scope of the appended claims.

I claim:

1. A storage device controller adapted to receive data from a processing unit, calculating an error correction code, and storing the data upon a data storage device, including:
   a) an input circuit means, to be coupled to the processing unit and to the data storage device, for receiving data organized as m-bit input symbols from the processing unit, and transmitting only such m-bit input symbols to the data storage device for storage;
   b) a symbol converter means, coupled to the input circuit, for convening a predetermined number of input symbols received by the input circuit into a predetermined number of output symbols having n-bits, where n is greater than m, and for inserting pad bits into the first of the predetermined number of output symbols such that only the first symbol includes the pad bits;
   c) an output circuit means, coupled to the symbol converter means, and to the data storage device, for receiving the m-bit input symbols from the input circuit means, the output circuit including an error correction code circuit for calculating an error correction code from the n-bit output symbols, the output circuit further transmitting the error correction code to the data storage device.

2. The storage device controller of claim 1, wherein the symbol converter includes:
   a) a staging register means coupled to the input circuit for temporarily storing at least one pad symbol and the predetermined number of input symbols;
   b) a presettable modulo-x counter means coupled to the input circuit for selecting which n bits stored in the staging register are to be included in each output symbol;
   c) a multiplexer circuit means coupled to the staging register, the modulo-x counter, and the output circuit, for coupling the selected n bits stored in the staging register to the output circuit.

3. The storage device controller of claim 2, wherein the data storage unit is one of a magnetic disk drive, magnetic tape drive, or optical disk drive.

4. The device controller circuit of claim 2, wherein the symbol converter further includes an output clock generator, coupled to the input circuit and the presettable modulo-x counter, for generating an output clock signal, the output clock signal having at least one state transition each time a valid output symbol is presented to the output circuit.

5. The device controller circuit of claim 2, wherein the modulo-x counter is coupled to an input clock signal and changes value each time the input clock signal transitions from a first logic level to a second logic level.

* * * * *